March 24, 1942.  J. H. MARCUM  2,277,244
GEAR SHIFT MECHANISM
Filed June 14, 1939   4 Sheets-Sheet 2

INVENTOR.
JAMES H. MARCUM
BY
ATTORNEYS

March 24, 1942.   J. H. MARCUM   2,277,244
GEAR SHIFT MECHANISM
Filed June 14, 1939   4 Sheets-Sheet 3

INVENTOR.
JAMES H. MARCUM
BY
Kwis Hudson & Kent
ATTORNEYS

March 24, 1942.　　　J. H. MARCUM　　　2,277,244
GEAR SHIFT MECHANISM
Filed June 14, 1939　　　4 Sheets-Sheet 4
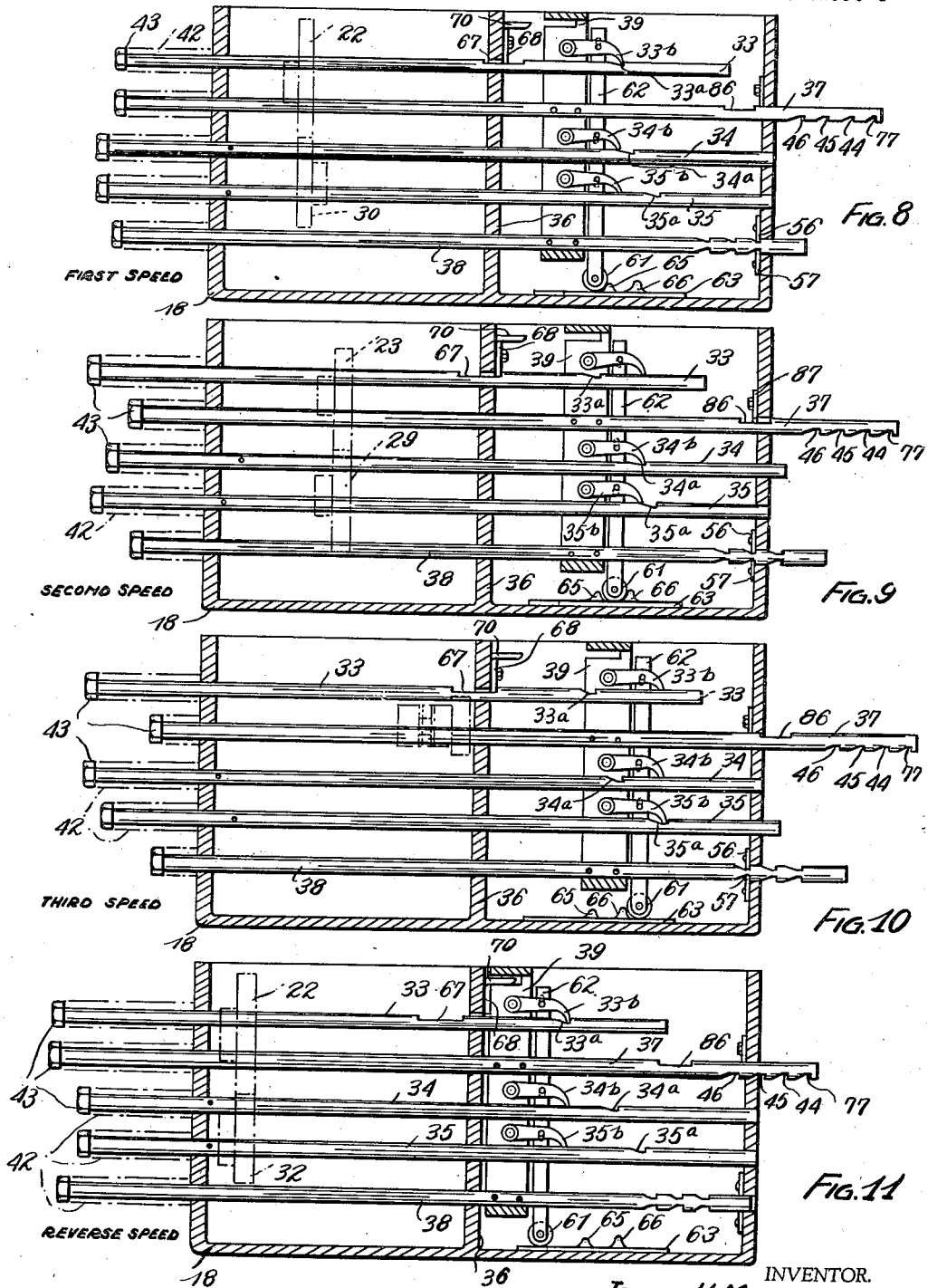
INVENTOR.
JAMES H. MARCUM
BY
ATTORNEYS Patented Mar. 24, 1942

2,277,244

UNITED STATES PATENT OFFICE 2,277,244

GEARSHIFT MECHANISM

James H. Marcum, Cleveland Heights, Ohio

Application June 14, 1939, Serial No. 279,085

12 Claims. (Cl. 192—3.5)

This invention relates to improvements in gear shift mechanism, that is mechanism designed primarily for shifting gears in the transmissions of automotive vehicles.

One of the objects of the invention is the provision of means which shall eliminate the conventional shift lever and enable the operator to make all necessary shifts between neutral and high speed by the actuation of foot pedals only.

Another object is the provision of separate controls for first, second and high speed, and the return of the first and second speed controls to normal position as the second and high speed controls respectively are operated to shift gears, whereby in the movement from high speed back to neutral no intermediate gears are either meshed or demeshed and whereby in the movement from second speed back to neutral the first speed gears are neither meshed nor demeshed.

Another object of the invention is the provision of latches for holding the gears against shifting toward lower speed positions, which latches are released only by the depression of both the clutch pedal and the brake pedal simultaneously, whereby the brake pedal may be operated separately without disturbing the gear set and the clutch pedal may be operated separately for declutching purposes only without disturbing the gear set.

Figure 1:
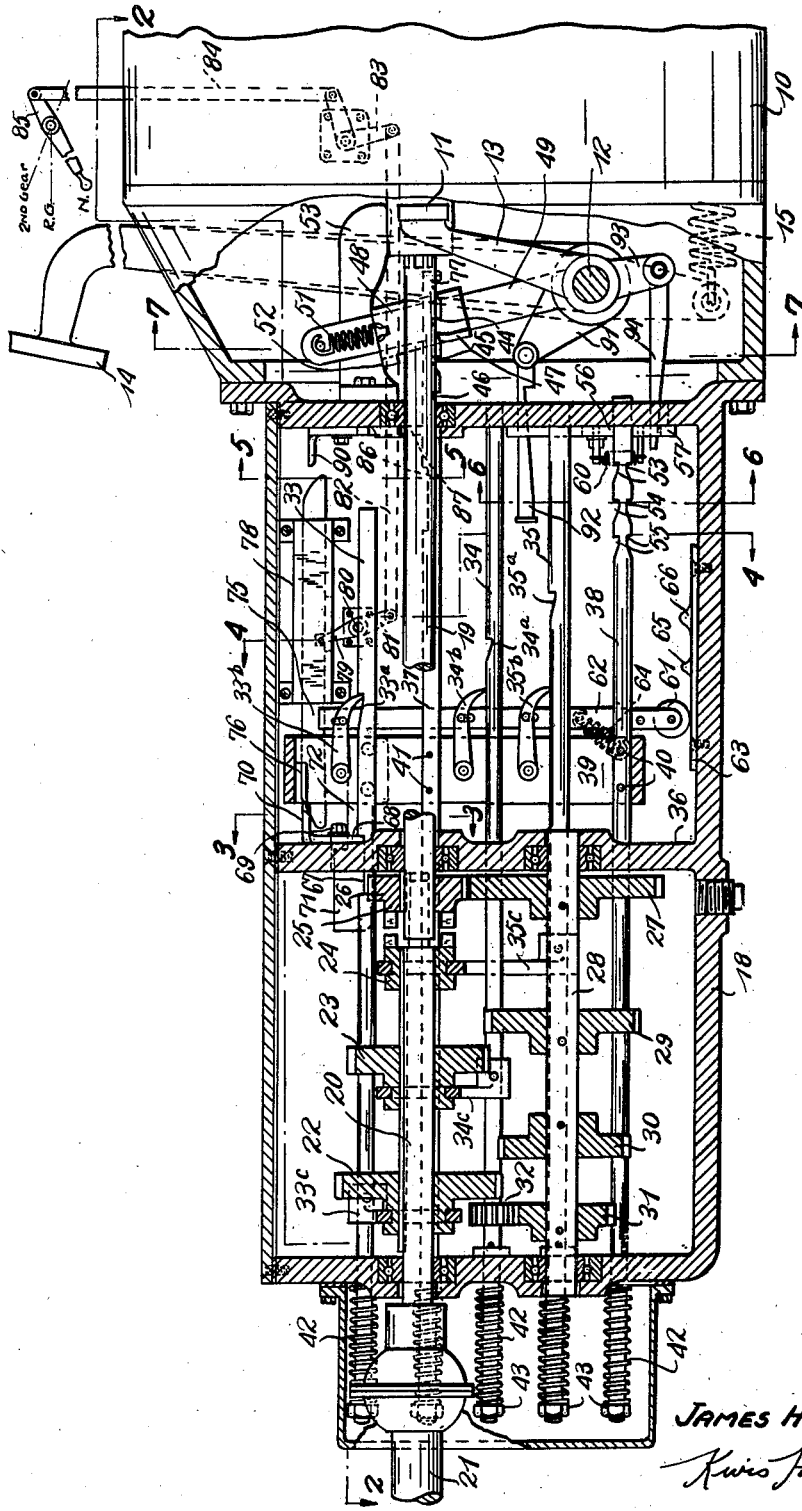

Other objects and features of novelty will appear as I proceed with the description of that embodiment of the invention which, for the purposes of the present application, is illustrated in the accompanying drawings, in which Fig. 1 is a vertical longitudinal sectional view of an automobile transmission and gear shifting mechanism, the disclosure being somewhat diagrammatic.

Figure 2:
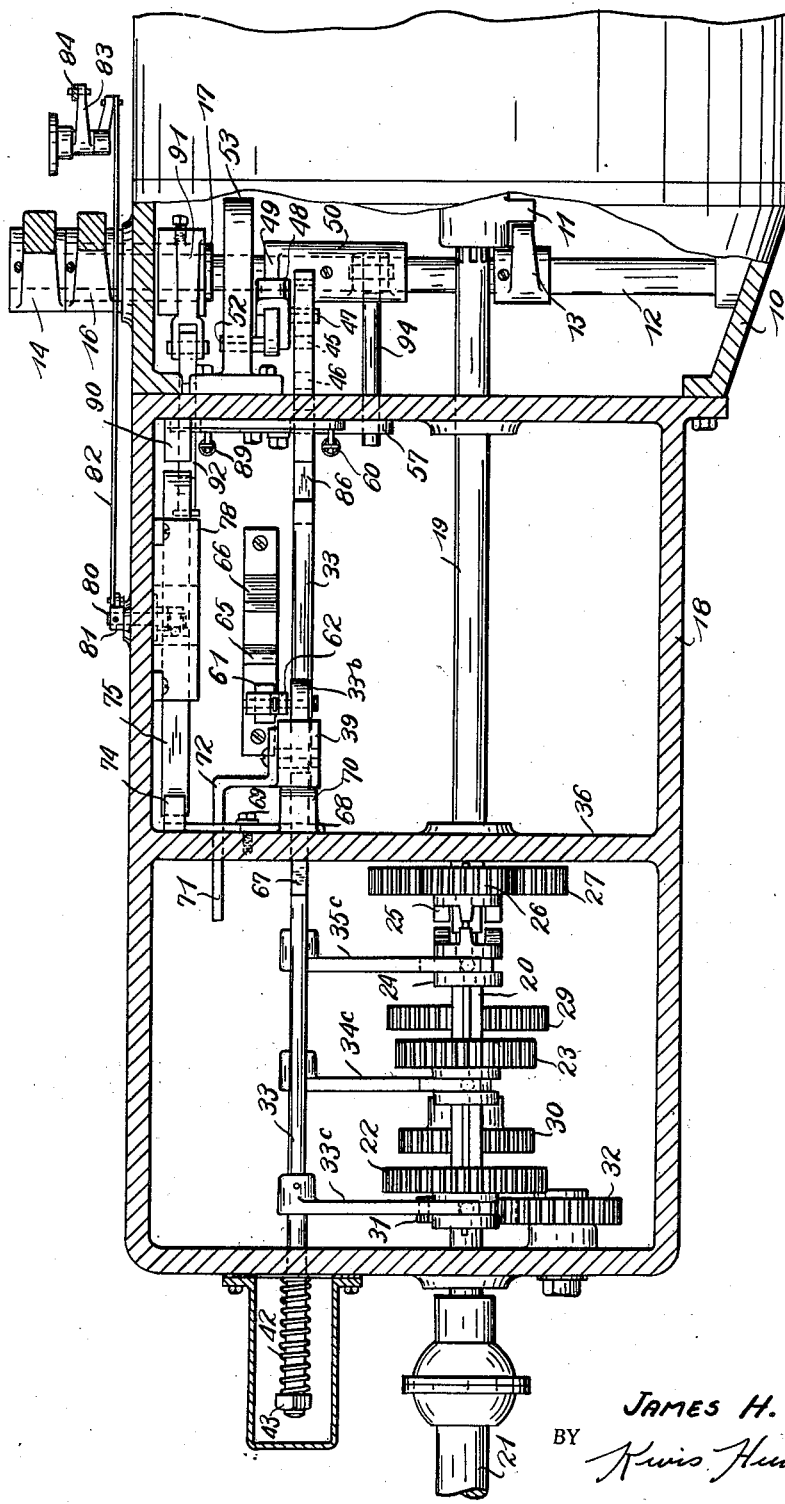

Fig. 2 is a horizontal sectional view of the same taken substantially on the line 2—2 of Fig. 1.

Figs. 3, 4, 5, 6 and 7 are vertical detail sectional views taken on the lines 3—3, 4—4, 5—5, 6—6 and 7—7 of Fig. 1, respectively.

Figs. 8, 9, 10 and 11 are diagrammatic illustrations showing different positions of the control mechanism corresponding to low speed, intermediate speed, direct drive and reverse gear positions, respectively.

In the drawings an automobile clutch housing is indicated at 10. It is to be understood that a conventional clutch may be employed. None is illustrated, but a pad 11 is shown, the movement of which forwardly disengages the clutch. 12 is a rock shaft upon which an arm 13 is pinned or otherwise secured, and by means of which the clutch pad 11 may be pressed forward. The shaft 12 at one end outside the housing carries a clutch pedal 14 that is normally urged rearwardly by suitable means such as a spring 15.

A brake pedal 16 is pinned to a sleeve 17 which surrounds and is journalled upon shaft 12. Pedal 16 is connected with the automobile brakes in any suitable manner, not shown, and in addition functions as part of the means for returning the shifting mechanism to neutral position as will hereinafter appear.

To the rear end of housing 10 there is bolted a casing 18 in which are housed the transmission, which may be of more or less conventional form, and my novel gear shifting mechanism. In line with the engine shaft, not shown, and adapted to be clutched thereto, is a drive shaft 19, and in line with that is the main transmission shaft 20 the rear end of which is connected by a universal joint with the propeller shaft 21 of the automobile. The shaft 20 is square or splined so as to maintain driving relation with slidable gears 22 and 23 and the movable part 24 of a dog clutch, the remaining part 25 of which is keyed to the rear end of shaft 19. The clutch part 25 carries a gear 26 which meshes continuously with a gear 27 that is pinned to jack shaft 28. Three other gears 29, 30 and 31 are also pinned to shaft 28, gear 31 being in constant mesh with an idler gear 32 mounted upon a stub shaft carried by the casing 18. As will be apparent, when the parts 24 and 25 of the dog clutch are in engagement the transmission is in high gear or direct drive. When these clutch parts are disengaged a lower speed or reverse drive may be obtained. For second speed the gear 23 must be slid forward until it meshes with gear 29, and for low speed gear 22 must be slid forward into mesh with gear 30. For reverse drive gear 22 is slid rearwardly until it comes into mesh with idler gear 32.

In the shifting mechanism which is the subject of the present invention the two gears 22 and 23 and the dog clutch element 24 are each individually operated, and all of them are arranged to be moved in the same direction when being shifted to operative position with the single exception that gear 22 moves rearwardly when it is desired to put the transmission into reverse drive. The operation of the transmission for forward speeds may be said to be a ratcheting operation which works step by step to shift into first, second and high speeds successively. An important feature of the invention however is that each shifter element employed to accomplish a given speed ratio is returned to its normal position as the transmission moves into the next higher speed, and because of this arrangement when the transmission is returned to neutral there is but one dog clutch to disengage or one pair of gears to demesh, depending upon whether the return is made from high speed or from one of the lower speeds.

The particular mechanism for accomplishing the results above mentioned may be varied more or less, and the disclosure herein should be understood as merely illustrative. In this disclosure there are three slides 33, 34 and 35 constituting shifter elements for first, second and high speed drive ratios. These slides are suitably mounted in the casing 18 and in an intermediate partition 36 thereof. There are also two rods 37 and 38 upon which there is rigidly mounted a bracket 39, as by means of pins 40 and 41. The slides 33, 34 and 35 and the rods 37 and 38 are all parallel and as herein disclosed are all in one vertical plane. Clutch elements are provided for removably connecting the bracket to the slides one at a time, which elements as herein shown may be pawls and notches. As illustrated each of the slides 33, 34 and 35 has a notch 33a, 34a and 35a respectively formed in its upper side adapted to be engaged by one of the pawls 33b, 34b or 35b that are pivoted upon the bracket 39. The rear ends of these slides and rods project through the rear wall of the casing where they are surrounded by coiled springs 42 that bear against the casing and against adjustable nuts 43. These springs are always under compression and tend to pull the slides and rods rearwardly or to the left as viewed in Figs. 1 and 2. Suitable cushions or dashpots, not shown, should be employed to check the action of the springs and prevent shock and noise.

The bracket 39 is arranged to be moved forwardly by the rod 37 which projects through the forward end wall of casing 18. The under side of this rod near its forward end is provided with notches 44, 45 and 46 each of which is adapted to be engaged by a ratchet tooth 47 on a collar 48 which is arranged to slide upon a crank arm 49 carried by a sleeve 50 that is pinned to shaft 12. The collar 48 is urged upwardly by a tension spring 51 which is hooked to the collar and to a pin at the upper end of the crank arm. This collar also carries a lip 52 extending in a direction opposite to that of ratchet tooth 47. Lip 52 engages the lower surface of a cam plate 53 which is suitably fastened to the front wall of the casing 18. The cam surface of plate 53 is so formed that as the arm 48 swings forwardly to substantially vertical position the ratchet 47 is permitted to maintain its engagement with one of the notches 44, 45 and 46 under the influence of spring 51. Further forward movement of the crank arm however cams the lip 52 downwardly and causes disengagement of the ratchet from its notch.

In order to prevent the bracket 39 from being pulled backwardly by springs 42 when the ratchet 47 releases rod 37 I provide latching means adapted to engage rod 38 at the end of each forward movement. This means comprises pairs of notches 53, 54 and 55 in the forward end of rod 38 that are adapted to be engaged by upper and lower latches 56 and 57 pivotally mounted on the casing at 58 and 59 respectively. A tension spring 60 tends to pull these latches into engagement with a pair of upper and lower notches. On account of the shape of the notches these latches are cammed outwardly as the rod 38 moves forwardly, but they prevent rearward movement of that rod and hence of the bracket 39 except when the two latches are withdrawn simultaneously by means under control of the operator, as will presently appear.

The slides 33, 34 and 35 have pinned thereto the yokes 33c, 34c and 35c, 33c and 34c engaging grooves in the hubs of gears 22 and 23, and 35c engaging a groove in the dog clutch element 24. Hence movement of slide 33 forwardly the proper distance brings gear 22 into mesh with gear 30. A similar movement of slide 34 will cause the meshing of gears 23 and 29 and a further similar movement of slide 35 will bring clutch elements 24 and 25 into engagement.

It will be apparent from the foregoing that starting with the parts in neutral position as illustrated in Fig. 1 each forward travel of pedal 14 will advance bracket 39 one step and that bracket 39 will be latched in each position successively by the latches 56 and 57. During the first movement pawl 33b will be in engagement with notch 33a and the slide 33 will accordingly be drawn forward pulling gear 22 into mesh with gear 30, when the parts will be in the positions illustrated in Fig. 8. During the next forward movement of the clutch pedal ratchet 47 will be in engagement with notch 45 and the bracket 39 will be drawn forward to the position of Fig. 9. The first part of this movement will cause a roller 61 on the lower end of lift bar 62 to raise pawl 33b out of engagement with its notch, whereupon slide 33 will move back to neutral position under the influence of its spring 42. Each of the pawls 33a, 34a and 35a is provided with a pin which is adapted to move in a vertical slot in the bar 62. This pin and slot construction permits the pawls to fall into the notches or to ride upon the upper surfaces of the slides. Gravity tends to keep roller 61 in engagement with a cam plate 63, but gravity may be assisted by a tension spring 64 if desired. Pawl 33b is lifted out of its notch by the roller 61 riding up over a cam projection 65 on the plate 63.

Movement of the bracket 39 forwardly from first speed position to second speed position illustrated in Fig. 9 will shift the individual slide 34 forwardly, bringing the second speed gears 23 and 29 into mesh.

During the third step forward lift bar 62 rises because of the roller 61 riding up over a second cam projection 66, disengaging pawl 34b from its notch, whereupon slide 34 is drawn back to neutral position. The bar 62 then immediately descends again, permitting pawl 35b to slip into notch 35a and to shift slide 35 individually in a forward direction to the position indicated in Fig. 10, which causes the clutch elements 24 and 25 to engage for direct drive.

In the top of slide 33 there is an elongated slot or recess 67 into which there normally extends a latch 68 that is pivotally mounted at 69 upon partition 36. When the latch 68 is in the recess 67 and in engagement with the shoulder at the forward end of that recess, slide 33 cannot travel rearwardly beyond neutral position illustrated in Fig. 1. In other words the slide is latched against movement into reverse gear position. Latch 68 also carries on its upper side a forwardly extending stop 70 which engages the bracket 39 when the latter returns to neutral position under the influence of springs 42 on rods 37 and 38.

Figure 3:
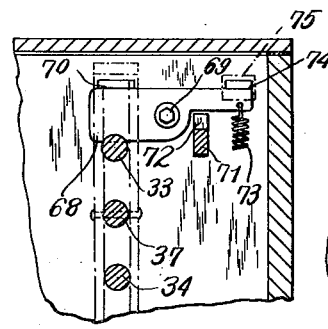
Figure 4:
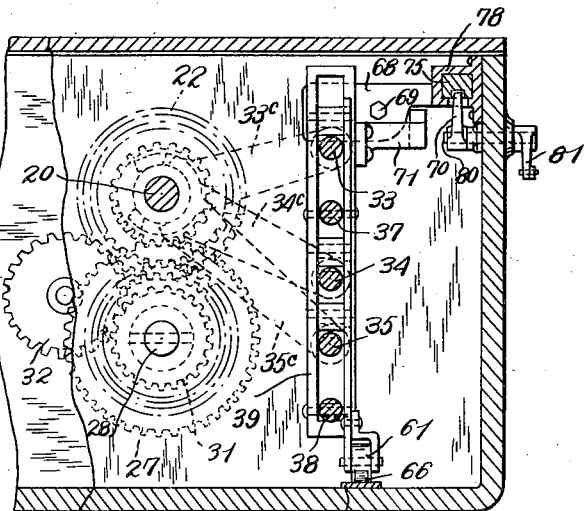
Figure 5:
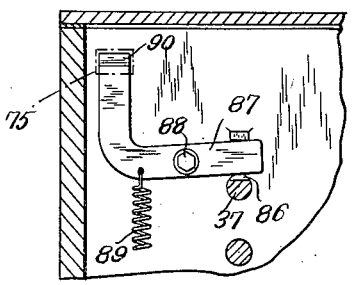
Figure 6:
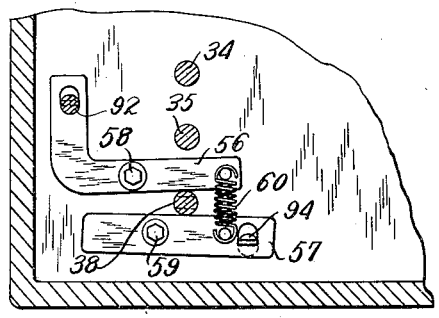
Figure 7:
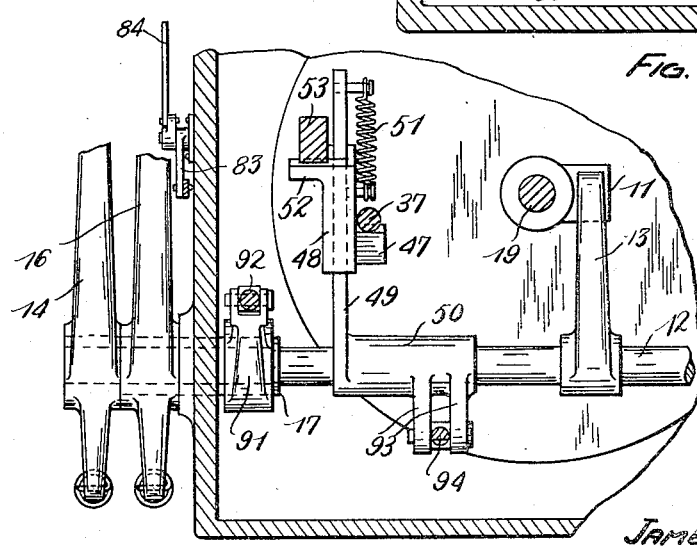

In all forward gear positions the latch 68 is prevented from turning upon its pivot 69 by an arm 71 that is fastened to bracket 39 and slides beneath and in engagement with latch 68, see Fig. 3. The forward end of arm 71 is cut away however as indicated at 72, so that when the bracket 39 is in neutral position it is possible to release latch 68. A coil spring 73 tends to swing latch 68 to unlatching position.

The free end of latch 68 carries a second horizontal forward projection 74, Figs. 2 and 3, which is adapted to be engaged on its under side by a cam-shaped end of slide bar 75. Even when latch 68 is released by arm 71 it cannot be moved to unlatching position if bar 75 is in its rearmost position. This bar is arranged to be moved by the operator when he desires to put the transmission into reverse, provided it stands in neutral at the time. If he withdraws bar 75 spring 73 raises the latch out of engagement with recess 67 in slide 33 and at the same time lifts stop 70 sufficiently to permit it to enter a recess 76 in bracket 39. Thereupon the slide 33 and the bracket 39 move rearwardly and the gear 22 meshes with gear 32, which puts the transmission into reverse gear. It will be observed that the pawl 33b remains in engagement with notch 33a during this rearward movement. Hence a forward motion of rod 37 will return the parts to neutral, a fourth notch 77 in the under side of rod 37 being provided for this purpose.

The bar 75 which is mounted in a guide 78 carried by a side wall of the housing, is arranged to be moved forward or backward by a crank 79 carried upon a short shaft 80 journalled in the wall of the casing. The free end of the crank extends into a small recess in the bar 75. On the same shaft externally of the casing there is a second crank 81 to which is pivoted a link 82 which in turn is pivoted to a bell crank 83, the latter being connected by vertical link 84 with a control lever 85 mounted within reach of the driver of the automobile. When the handle of this lever is moved upwardly to an intermediate position bar 75 is moved forwardly far enough to release latch 68 and permit the springs 42 to shift the transmission into reverse gear.

In the upper side of rod 37 there is an elongated notch 86 that is adapted to be engaged by a latch 87 which is pivotally mounted at 88 upon the front wall of the casing and is normally held in inoperative position by a coil spring 89. The free end of latch 87 has a rearwardly extending horizontal projection 90 which is adapted to be engaged by the forward cam end of bar 75, whereby the latch may be forced down into notch 86 when the transmission is in high speed position. This is for the purpose of enabling a driver to shift quickly from high speed to second speed, the procedure being to first swing the lever 85 up to second gear position, then to work the controls which are used ordinarily to return the transmission to neutral whereupon the shoulder at the forward end of notch 86 catches against the latch 87, and then to operate the clutch pedal which will cause ratchet 47 to engage notch 45 and advance the rod 37 a short distance into second speed position.

On the sleeve 17 which moves with brake pedal 16 as previously stated, there is pinned the hub of a crank arm 91 having a bifurcation in its outer end in which is pivotally mounted the forward extremity of a cam slide 92. This cam slide when drawn forward by the depression of pedal 16 tilts latch 56 counterclockwise as viewed in Fig. 6 against the action of spring 60 so as to withdraw the latch from operative position in case it is resting in one of the notches 53, 54 and 55 at the time. The sleeve 50 which moves with the clutch pedal carries a pair of spaced crank arms 93 between which is swiveled the forward end of a cam slide 94 that projects through a slot in latch 57 and acts when the pedal is depressed to swing that latch down against the action of spring 60 and out of operative latching relation with rod 38. It will be apparent therefore that when the transmission is in one of the forward speed positions and the two latches 56 and 57 are in engagement with one of the pairs of notches 53, 54 and 55 it will be held there against accidental return to neutral, and that the two latches must be withdrawn simultaneously by the operation of both foot pedals in order to release rod 38 and enable springs 42 to return the parts to neutral position.

*Operation.*—It will be apparent from the foregoing description that in the normal operation of an automotive vehicle equipped with my gear shifting mechanism the necessary shifting of the transmission gears during normal forward travel is accomplished by foot pressure only, leaving the hands entirely free to manipulate the steering wheel and other control means, and without interfering with the normal operation of the clutch and brake pedals. A certain amount of clutch pedal movement must be provided for the simple operation of declutching before any gear shifting takes place, in order that the driver may declutch the engine without affecting the transmission if he so desires. This is accomplished by setting the ratchet 47 in such a position on the collar 48 that it will not engage one of the notches in rod 37 until an appreciable part of the clutch pedal movement has taken place. This will be apparent from an inspection of Fig. 1.

Starting with neutral position the series of shifts through first and second speeds into high speed may be effected rapidly by three reciprocations of the clutch pedal. At each speed position the latches 56 and 57 act to hold the shifting elements in place. When the slide 34 is advanced to shift the transmission into second speed, slide 33 is released by its pawl 33b and permitted to return to normal or neutral position, and when slide 35 is advanced slide 34 is similarly released and permitted to return to neutral. When the bracket 39 returns to neutral position along with rods 37 and 38, that is upon the simultaneous depression of both pedals 14 and 15, pawl 33b drops into notch 33a and the mechanism is set for another series of forward shifts. Latch 87 will seldom be used, because it is so simple and easy to return to neutral and advance through first speed to second speed. However, when it is desired to shift back to second speed without losing headway appreciably, as for instance when traveling up a steep grade, the latch 87 may be used to considerable advantage.

It is impossible for the operator to inadvertently shift to reverse gear when the transmission is in any position other than neutral, that is on account of arm 71. When the transmission is in neutral however the operator may throw lever 85 to the middle position, whereupon latch 68 is withdrawn from recess 67 and stop 70 comes opposite slot 76 in bracket 39. The springs 42 then pull the slide 33 and the rods 37 and 38 together with bracket 39 back to reverse gear position illustrated in Fig. 11. Pawl 33b remains in engagement with notch 33a, and when it is desired to again resume neutral position the operator depresses the clutch pedal causing ratchet 47 to engage notch 77 in rod 37 and move the bracket with slide 33 forwardly to neutral position. In fact with four reciprocations of the pedal the transmission may be moved forward from reverse gear to high speed.

Having thus described my invention, I claim:

1. In combination with a transmission having a neutral condition and a plurality of forward speed ratios comprising transmission setting means individually movable in the same direction for each ratio, a clutch, a clutch pedal adapted to be moved forward by foot pressure and automatically returnable to normal position, and means associated with said pedal and actuated exclusively by the forward movement of the pedal for effecting a shift from one of said forward speed ratios to the next higher speed ratio and for simultaneously returning the transmission setting means of said first-named speed ratio to the position which it occupies when the transmission is in neutral condition.

2. In combination with a transmission having a neutral condition, first and second gear ratios and direct drive, transmission setting means individually operable to set the transmission for each of said forward speeds, a clutch, a clutch pedal, means adapted to be set in motion exclusively by successive depressions of said pedal for shifting the transmission from neutral to first speed to second speed to direct drive, and means acting simultaneously with said pedal depressions for shifting from first to second and from second to high to restore the first speed and second speed transmission setting means respectively to the condition which they occupy in neutral.

3. In combination with a transmission having a neutral condition, first and second speed gear ratios and direct drive, shifting mechanism comprising setting means each operable individually to set the transmission for one forward speed, a pedal, means adapted to be set in motion exclusively by successive reciprocations of said pedal for shifting the transmission from neutral to first speed to second speed to direct drive, and means acting simultaneously with the shift from first to second and from second to high to restore the first speed and second speed setting means respectively to the condition which they occupy in neutral, means for automatically latching the transmission in said first, second or high speed positions, and means under control of the driver for releasing said latching means and returning the transmission to neutral.

4. In mechanism of the class described, a clutch, a clutch pedal, a plurality of slides movable in parallel paths, transmission setting means for a given forward speed attached to each of said slides, means operatively associated with the clutch pedal and functioning during the declutching operations for shifting said slides separately in the same direction to effect operative driving relation for each of said speeds in regular succession, and means set in motion by the shifting of one of said slides for returning the previously shifted slide to its normal position.

5. In mechanism of the class described, a clutch, a clutch pedal, a plurality of slides movable in parallel paths, transmission setting means for a given forward speed attached to each of said slides, means operatively associated with the clutch pedal and functioning during the declutching operations for shifting said slides separately in the same direction to effect operative driving relation for each of said speeds in regular succession, means set in motion by the shifting of one of said slides for returning the previously shifted slide to its normal position, and means under the control of the driver for returning the highest speed slide to its normal position.

6. In mechanism of the class described, a plurality of slides movable in parallel paths, transmission setting means for a given forward speed attached to each of said slides, means for shifting said slides separately in the same direction to effect operative driving relation for each of said speeds in regular succession, means set in motion by the shifting of one of said slides for returning the previously shifted slide to its normal position, and means under the control of the driver for returning the last shifted slide to normal position and simultaneously resetting the mechanism to neutral position ready to repeat the cycle.

7. In combination with a sliding gear change speed transmission, a plurality of slides movable in parallel paths, means associated with each of said slides for effecting a gear change, a bracket, manually operable means for advancing said bracket step by step in a direction parallel to the paths of said slides from neutral position through low speed and intermediate speed to direct drive position, clutch elements on said bracket each adapted to engage one of said slides for each forward movement of the bracket in order to correspondingly move a slide, means for automatically disengaging a previously active clutch element from its slide as a given clutch element engages its slide, and means for returning each slide to normal position when its clutch element is disengaged.

8. In combination with a sliding gear change speed transmission, a plurality of slides movable in parallel paths, means associated with each of said slides for effecting a gear change, a bracket, manually operable means for advancing said bracket step by step in a direction parallel to the paths of said slides from neutral position through low speed and intermediate speed to direct drive position, clutch elements on said bracket each adapted to engage one of said slides for each forward movement of the bracket in order to correspondingly move a slide, means for automatically disengaging a previously active clutch element from its slide as a given clutch element engages its slide, means for returning each slide to normal position when its clutch element is disengaged, and means under the control of the operator for disengaging the clutch element on the highest speed slide and simultaneously returning said bracket to its normal or neutral position.

9. In combination with a sliding gear change speed transmission, a plurality of slides movable in parallel paths, means associated with each of said slides for effecting a gear change, a bracket, manually operable means for advancing said bracket step by step in a direction parallel to the paths of said slides from neutral position through low speed and intermediate speed to direct drive position, clutch elements on said bracket each adapted to engage one of said slides for each forward movement of the bracket in order to correspondingly move a slide, means for automatically disengaging a previously active clutch element from its slide as a given clutch element engages its slide, means for returning each slide to normal position when its clutch element is disengaged, means under the control of the operator for disengaging the clutch element on the highest speed slide and simultaneously returning said bracket to its normal or neutral position, and a latch settable to catch and hold said bracket in an intermediate position during its rearward travel toward normal position.

10. In mechanism of the class described, a plurality of slides movable in parallel paths, means tending to move said slides rearwardly, transmission setting means for a given forward speed attached to each of said slides, the setting means for the low speed being adapted also to set the transmission in reverse, means for shifting said slides separately to effect operative driving relation for each of said forward speeds in regular succession, means set in motion by the shifting of one of said slides forwardly for returning the previously shifted slide to its normal position, a stop for normally preventing said low speed slide from moving rearwardly beyond a given neutral position, and means under the control of the operator for releasing said stop.

11. In combination with a sliding gear change speed transmission, a clutch, a clutch pedal, a brake pedal, gear shifting mechanism comprising a plurality of slides movable in parallel paths, transmission setting means for a given forward speed attached to each of said slides, means actuated by successive depressions of the clutch pedal for simultaneously releasing the clutch and shifting successive slides one at a time in the same direction for changing the transmission step by step from neutral through low speed and intermediate speed to direct drive position, and means effective only upon the depression of both the clutch pedal and the brake pedal for returning the gear shifting mechanism to neutral position.

12. In combination with a sliding gear change speed transmission, a clutch, a clutch pedal, a further control element, gear shifting mechanism comprising a plurality of slides movable in parallel paths, transmission setting means for a given forward speed attached to each of said slides, means actuated by successive depressions of the clutch pedal for simultaneously releasing the clutch and shifting successive slides one at a time in the same direction for changing the transmission step by step from neutral through low speed and intermediate speed to direct drive position, and means effective only upon the actuation of both said clutch pedal and said further control element for returning the gear shifting mechanism to neutral position.

JAMES H. MARCUM.